United States Patent
Doerr et al.

(10) Patent No.: US 9,042,507 B2
(45) Date of Patent: May 26, 2015

(54) NUCLEAR REACTOR GREEN AND SINTERED FUEL PELLETS, CORRESPONDING FUEL ROD AND FUEL ASSEMBLY

(75) Inventors: Wolfgang Doerr, Herzogenaurach (DE); Andreas Hoff, Lingen (DE); William Jentzen, Kennewick, WA (US); Dave Curran, Richland, WA (US); Alain Chotard, Neuville sur Saone (FR); Pascal Deydier, Genas (FR)

(73) Assignee: AREVA NP, Courbevoie (FR)

( * ) Notice: Subject to any disclaimer, the term of this patent is extended or adjusted under 35 U.S.C. 154(b) by 511 days.

(21) Appl. No.: 13/121,907

(22) PCT Filed: Sep. 29, 2009

(86) PCT No.: PCT/EP2009/062620
§ 371 (c)(1),
(2), (4) Date: Mar. 30, 2011

(87) PCT Pub. No.: WO2010/037748
PCT Pub. Date: Apr. 8, 2010

(65) Prior Publication Data
US 2011/0176650 A1    Jul. 21, 2011

(30) Foreign Application Priority Data

Sep. 30, 2008 (WO) .................. PCT/IB2008/055633

(51) Int. Cl.
*G21C 3/58* (2006.01)
*G21C 21/02* (2006.01)
*G21C 3/04* (2006.01)

(52) U.S. Cl.
CPC ...... *G21C 21/02* (2013.01); *G21C 3/04* (2013.01); *G21C 3/58* (2013.01); *G21C 2003/047* (2013.01); *G21C 2003/048* (2013.01); *Y02E 30/38* (2013.01)

(58) Field of Classification Search
CPC ............. G21C 21/02; G21C 3/04; G21C 3/58
USPC .......................................... 376/409, 412, 434
See application file for complete search history.

(56) References Cited

U.S. PATENT DOCUMENTS

| | | | | |
|---|---|---|---|---|
| 3,801,451 | A | * | 4/1974 | Scharf .......................... 376/426 |
| 4,129,477 | A | * | 12/1978 | Johansson et al. ............. 376/429 |
| 4,814,137 | A | * | 3/1989 | Beuchel et al. ................ 376/429 |
| 2004/0047445 | A1 | * | 3/2004 | Delafoy et al. ................ 376/409 |
| 2009/0122948 | A1 | | 5/2009 | Charmensat et al. | |

FOREIGN PATENT DOCUMENTS

| | | |
|---|---|---|
| CA | 914320 | 11/1972 |
| EP | 0287875 | 10/1988 |
| WO | WO 2007028870 | 3/2007 |

* cited by examiner

*Primary Examiner* — Timothy A Brainard

(57) ABSTRACT

A sintered fuel pellet for a water nuclear reactor fuel rod including a peripheral wall extending along a central axis and two end faces. At least one of the end faces includes at least a first chamfer extending from the peripheral wall towards the central axis with a first non-zero slope with respect to a plane perpendicular to the central axis and a second chamfer extending from the first chamfer towards the central axis with a second non-zero slope with respect to a plane perpendicular to the central axis, wherein the first slope is different from the second slope.

15 Claims, 2 Drawing Sheets

Figure 1:
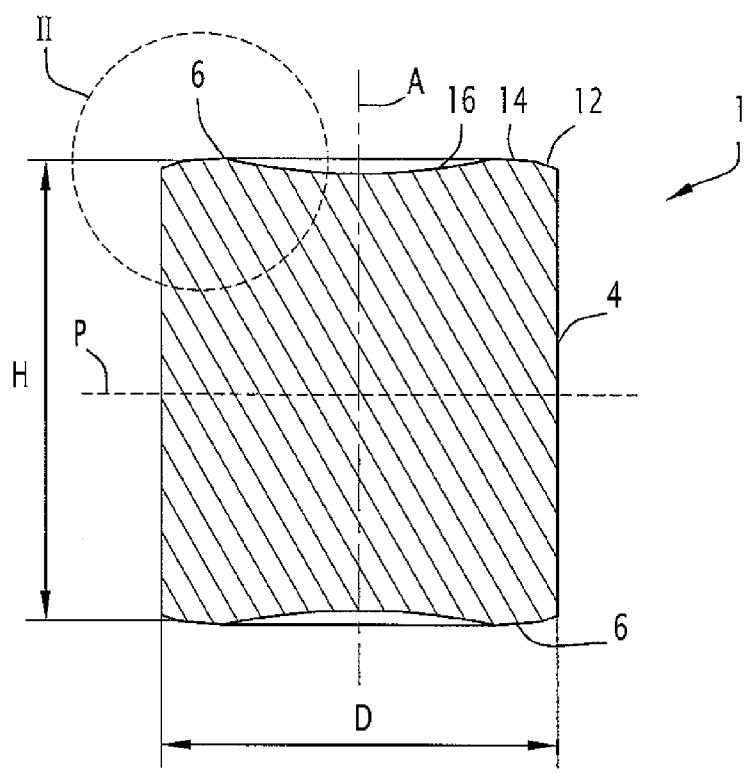

NUCLEAR REACTOR GREEN AND SINTERED FUEL PELLETS, CORRESPONDING FUEL ROD AND FUEL ASSEMBLY

The present invention relates to a sintered fuel pellet for a light or heavy water nuclear reactor fuel rod of the type comprising a peripheral wall extending along a central axis and two end faces, wherein at least one of the end faces comprises at least a first chamfer extending from the peripheral wall towards the central axis with a first non-zero slope with respect to a plane perpendicular to the central axis.

BACKGROUND

In pressurized water reactor (PWR), including Russian design VVER (Vodaa Vodiannee Energititscherski Reactor, in English Water Water Energy Reactor), or boiling water reactor (BWR) or pressurized heavy water reactor (PHWR), each nuclear fuel rod comprises a pile of sintered fuel pellets surrounded by a cladding. A fuel pellet is obtained by sintering of a green fuel pellet mainly made from uranium oxide with any content of the isotope 235 and/or from plutonium oxide, with possible addition of burnable poison, such as for instance $Gd_2O_3$.

A fuel pellet of the above-mentioned type is known from WO-02/45096. A dish-shaped recess is provided at the center of the end face around the central axis, the chamfer and the recess being joined by a flat surface.

SUMMARY OF THE INVENTION

Besides easing the loading of the fuel pellet in the cladding, the main function of the chamfer is to reduce the risk of chipping of the pellet during the manufacturing thereof and its handling.

Such chipping leads to defects in the finished pellet, which produce hot spots in the coolant flowing around the fuel rod. Such hot spots prevent a uniform repartition of temperatures around the fuel rod, which reduces the efficiency of the reactor.

Hot cell examinations of fuel rods failed by pellet cladding interaction (PCI) indicate that the failures are attributable to circumferential Missing Pellet Surface (MPS) predominantly extended to the pellet end. The fragments of fuel materials produced by such chipping may become trapped in the gap between the peripheral wall of the pellets and the cladding and increase the mechanical stress on the cladding, which can lead to local cladding failure due to pellet clad mechanical interaction (PCMI). In addition, the missing pellet surface due to the chip can also create high mechanical stress to the cladding because of the missing cladding support and, combined with the hot spot and enhanced by fission products, can also result in a cladding failure. Such failures can cause radioactive gases and materials to leak into the reactor coolant and the reactor atmosphere.

Despite the chamfer, some chipping might occur with the fuel pellet disclosed in WO-02/45096.

An object of the invention is to further reduce the risks of chipping.

To this end, the invention provides a sintered fuel pellet of the type described above, the pellet further comprising a second chamfer extending from the first chamfer towards the central axis with a second non-zero slope with respect to a plane perpendicular to the central axis, wherein the first slope is different from the second slope.

The second chamfer prevents the appearance of a sharp edge between the first chamfer and the second chamfer as will be described later, which guarantees that the contact between two superposed pellets remains soft. The risks of chipping are therefore reduced.

According to other features of the sintered fuel pellet:
the first slope is greater than the second slope;
the first slope is substantially comprised between 7° and 40°;
the second slope is substantially comprised between 0.2° and 10°;
the second slope is substantially comprised between 0.4° and 9°;
the peripheral wall is substantially cylindrical;
the end faces are substantially symmetrical relative to a plane substantially perpendicular to the central axis and crossing the peripheral wall substantially in its middle;
the ratio between the length of the peripheral wall and the diameter of said peripheral wall is substantially comprised between 0.4 and 2; and
each end face comprises at least a first chamfer extending from the peripheral wall towards the central axis with a first non-zero slope with respect to a plane perpendicular to the central axis and a second chamfer extending from the first chamfer towards the central axis with a second non-zero slope with respect to a plane perpendicular to the central axis, wherein the first slope is different from the second slope.

According to another aspect, the invention provides a green fuel pellet for a water nuclear reactor fuel rod, intended to be sintered to obtain a sintered fuel pellet as described above, comprising a peripheral wall extending along a central axis and two end faces, wherein at least one of the end faces comprises at least a first chamfer extending from the peripheral wall towards the central axis with a first non-zero slope with respect to a plane perpendicular to the central axis and a second chamfer extending from the first chamfer towards the central axis with a second non-zero slope with respect to a plane perpendicular to the central axis, wherein the first slope is different from the second slope.

As explained above, the second chamfer of the green fuel pellet guarantees, in the sintered pellet, a soft contact between two superposed pellets in a fuel rod and reduces the risks of chipping induced by this contact. Even if the sintering process is carried on for too long, the second chamfer will become, at the most, a flat surface. The sintered pellet will therefore have a conventional shape, but with a lowered risk of sharp edges.

According to other features of the green fuel pellet:
the first slope is substantially comprised between 7° and 40°;
the second slope is substantially comprised between 0.2° and 10°; and
the second slope is substantially comprised between 0.4° and 9°.

According to another aspect, the invention provides a fuel rod for a water nuclear reactor fuel assembly comprising a cladding and a stack of sintered fuel pellets in the cladding, at least one of the sintered fuel pellets being a pellet as described above.

According to another aspect, the invention provides a water nuclear reactor fuel assembly comprising a skeleton and a bundle of fuel rods, wherein at least one of the fuel rods is a fuel rod as described above.

BRIEF DESCRIPTION OF THE INVENTION

Figure 2:
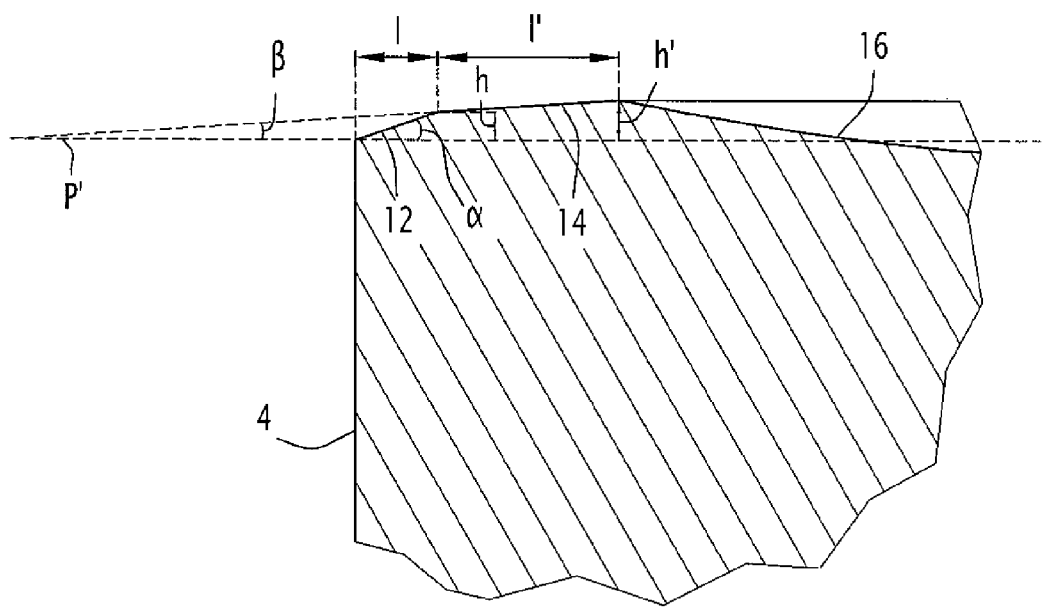
Figure 3:
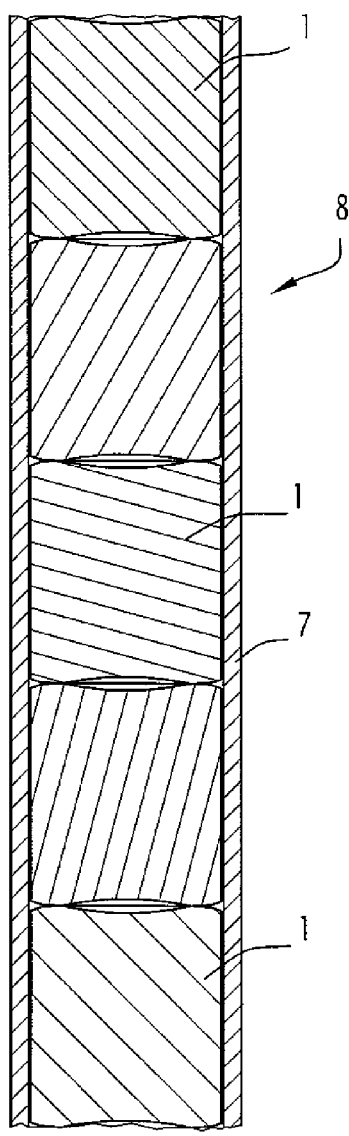
Figure 4:
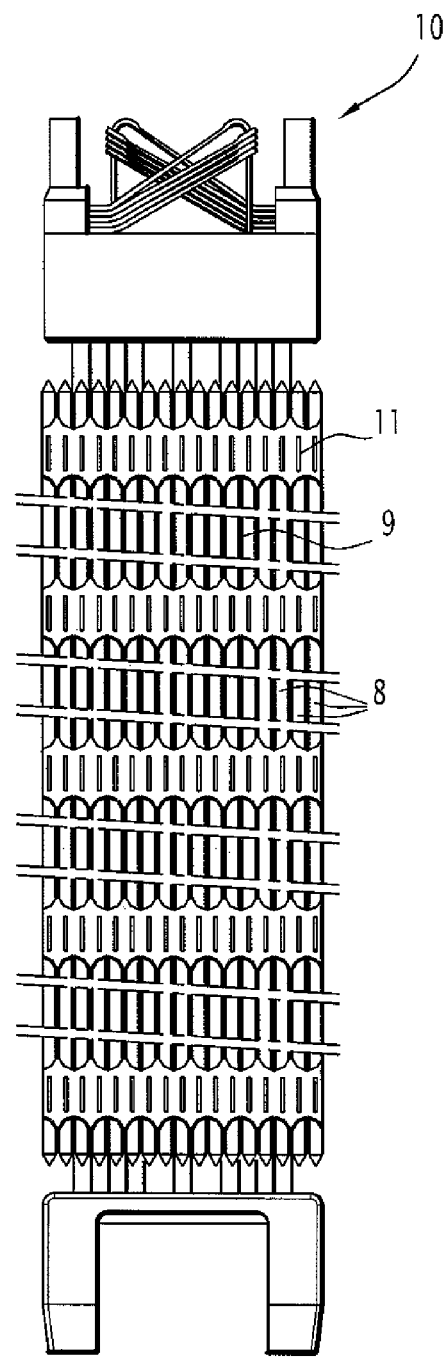

Other aspects and advantages of the invention will appear upon reading the following description, given by way of example and made with reference to the annexed drawings, wherein:

FIG. 1 is a schematic sectional view of a sintered fuel pellet according to the invention, FIG. 2 is an enlarged view of area II of FIG. 1, FIG. 3 is a schematic sectional view of a fuel rod according to the invention, FIG. 4 is a schematic side view of a nuclear fuel assembly according to the invention.

DETAILED DESCRIPTION

FIG. 1 shows a sintered fuel pellet 1 comprising a peripheral wall 4 and two end faces 6. The sintered fuel pellet 1 is intended to be placed in a cladding 7 and to be superposed with other similar sintered fuel pellets in order to form a water nuclear reactor fuel rod 8, as shown in FIG. 3. Such a fuel rod 8 will be introduced in a fuel rod bundle 9 of a nuclear fuel assembly 10, this bundle 9 being held by a skeleton 11, as shown in FIG. 4.

FIG. 4 shows a typical fuel assembly 10 with a square array for a PWR. The fuel assemblies 10 for VVER typically have a hexagonal array. The structures used for BWR and PHWR fuel assemblies are also different but the fuel pellets and the fuel rods are similar, the dimensions being adapted to each specific design. In all cases, the cladding 7 is for example made in a zirconium based alloy.

The peripheral wall 4 extends along a central axis A in an axial direction and the end faces 6 extend from the edges of the peripheral wall 4 towards the central axis A.

For a fuel pellet 1 used in a PWR, the diameter D of the peripheral wall 4 is usually comprised substantially between 7.4 mm and 9.8 mm depending on the fuel assembly array (mainly 14×14 to 19×19). For instance, the diameter D of a fuel pellet 1 for a 17×17 PWR fuel assembly is typically around 8.192 mm. Values for a VVER fuel pellet 1 are similar: for instance D varies typically between 7.51 mm and 7.60 mm for a VVER-1000.

For a fuel pellet 1 used in a BWR, the diameter D of the peripheral wall 4 is usually comprised substantially between 8.0 mm and 10.3 mm (and can mount up to 12.25 mm for the 6×6 oldest designs) depending on the fuel assembly array (mainly 6×6 to 13×13). For instance, the diameter D of a fuel pellet 1 for a 10×10 BWR fuel assembly is typically around 8.670 mm.

For a fuel pellet 1 used in a PHWR, the diameter D of the peripheral wall 4 is usually comprised substantially between 12.0 mm and 15.3 mm depending on the fuel assembly array. For instance, the diameter D of a fuel pellet 1 for a 19-elements bundle PHWR fuel assembly is typically around 14.3 mm.

In all these cases, the ratio between the length H of the peripheral wall 4 and the diameter D, i.e. H/D, is substantially comprised between 0.6 and 2. For instance, the typical H/D ratio is around 1.6 for a 17×17 PWR fuel pellet, around 0.7 for a VVER fuel pellet, around 1.2 for a 10×10 BWR fuel pellet, and around 1.7 for a PHWR fuel pellet.

According to another embodiment, the fuel pellet 1 may have a reduced H/D ratio as disclosed in WO-02/45096. In such a fuel pellet 1, for a diameter D substantially equal to 8.192 mm, the H/D ratio is for example comprised between 0.4 and 0.6, and preferably equal to 0.5.

In the shown embodiment, the end faces 6 are substantially symmetrical relative to a plane P substantially perpendicular to the central axis A and crossing the peripheral wall 4 substantially in its middle. Therefore, only the upper end face 6 will now be described with reference to FIGS. 1 and 2.

The end face 6 comprises a first chamfer 12 extending from the peripheral wall 4 towards the central axis A and having a first non-zero slope. The first slope is defined by the angle α between the first chamfer 12 and a plane P' perpendicular to the central axis A. The angle α is substantially comprised between 7° and 40°. In a specific embodiment, the angle α is substantially equal to 18°. The dimension h of the first chamfer 12 along the axis A is substantially comprised between 0.10 mm and 0.20 mm and is preferably equal to 0.15 mm. The dimension l of the first chamfer 12 along the plane P' is substantially comprised between 0.26 mm and 0.66 mm and is preferably equal to 0.46 mm.

The first chamfer 12 enables to reduce the chipping of the fuel pellet 1 during the manufacturing thereof and eases the loading of the fuel pellet 1 in the cladding 7. It further reduces the risks of degrading the fuel pellet 1 during this loading by suppressing sharp corners between the peripheral wall 4 and the end faces 6.

The end face 6 further comprises a second chamfer 14 extending from the first chamfer 12 towards the central axis A and having a second non-zero slope different from the first slope. The second slope is defined by the angle between the second chamfer 14 and the plane P'. The angle β is substantially comprised between 0.2° and 10°. In particular, the angle β is substantially comprised between 0.4° and 9°. In a specific embodiment, the angle β is substantially equal to 3°. The dimension h' of the first chamfer 12 and the second chamfer 14 along the axis A is substantially comprised between 0.15 mm and 0.25 mm and is preferably equal to 0.20 mm. The dimension l' of the second chamfer 14 along the plane P' is substantially comprised between 0.64 mm and 1.34 mm and is preferably equal to 0.99 mm.

The first and the second slopes are of the same sign and are directed towards the exterior of the fuel pellet 1, as shown in FIG. 2. The first slope, which is relatively "steep", is greater than the second slope which is relatively "smooth".

According to an embodiment, the first and the second chamfers 12 and 14 extend on the whole periphery of the end face 6.

The second chamfer 14 forms the contact surface of the fuel pellet 1 with its neighboring pellet when the fuel pellets 1 are superposed in a cladding 7 to form a fuel rod 8.

According to the embodiment shown in FIGS. 1 to 3, the end face 6 further comprises a dish-shaped recess 16 extending from the second chamfer 14 and around the central axis A. The recess 16 is adapted to enable an axial thermal expansion of the fuel pellet 1 when the nuclear fuel rod 8 is used in a nuclear reactor.

The maximal depth of the recess 16 is located on the central axis A and is for example substantially comprised between 0.1 mm and 0.5 mm and preferably comprised between 0.2 mm and 0.4 mm.

For a fuel pellet 1 used in a water reactor, the diameter of the recess 16 is substantially comprised between 4.5 mm and 7.2 mm. In a specific embodiment, the diameter of the recess 16 is substantially equal to 5.3 mm for a peripheral wall 4 having a diameter D substantially equal to 8.192 mm and 6.4 mm for a peripheral wall 4 having a diameter D substantially equal to 9.33 mm. Such a dish-shaped recess 16 and its function are commonly known in fuel pellets and will not be described in greater detail herein.

According to another embodiment, the fuel pellet may have a central hole instead of, or in addition to, the dish-shaped recess 16. The central hole extends from one end face 6 to the opposite end face 6 and is centered around the central axis A. The diameter of the hole is for instance in the range of 1 to 2 mm, even if higher values may have been tested. Such a central hole and its function are commonly known in fuel pellets and will not be described in greater detail herein.

The above described sintered fuel pellet 1 is obtained by sintering a green fuel pellet.

The green fuel pellet is obtained by compression of fuel materials, for example a powder comprising uranium oxide with any content of the isotope 235 and/or plutonium oxide with possible addition of burnable poison, such as for instance $Gd_2O_3$, into a suitable mold, in order to make the peripheral wall 4 substantially cylindrical. It is possible to use other fissile material than uranium oxide and/or plutonium oxide or to add other or additional additives than burnable poison such as pore former, lubricant, for example, to obtain the green pellet.

The green fuel pellet has substantially the same shape and slightly larger dimensions than the sintered fuel pellet 1, which means that it also comprises a peripheral wall 4 and two end faces 6, each comprising a first 12 and a second chamfers 14 and, according to the embodiment shown in the Figs, a dish-shaped recess 16.

The green fuel pellet is sintered and may be rectified to acquire the final shape and dimensions of the above-described sintered fuel pellet 1.

During the sintering step of the green fuel pellet, the second chamfer 14 tends to be moved in axially due to the densification of the fuel material. Because of the second slope, the contact surface will always exhibit a second slope of the same sign than the first slope of the first chamfer 12, despite the manufacturing tolerances. Even if the sintering process is carried on for too long, the second chamfer 14 will become, at the most, a flat surface.

This will prevent the appearance of a sharp edge between the first chamfer 12 and the contact surface, formed by the second chamfer 14. The contact surface between two superposed fuel pellets 1 is therefore guaranteed to be soft so that the risks of chipping are reduced, the contact point between the superposed pellets being shifted to the rim of the dish-shaped recess.

Indeed, the inventors surprisingly discovered that, in the prior art pellets, the risk of chipping was connected to the appearance of a sharp edge between the first chamfer 12 and the contact surface of the pellets during the sintering of the green pellet.

In the fuel pellets of the prior art, the contact surface, which was intended to be horizontal, could actually exhibit a slope directed towards the inner part of the pellet and inverted relative to the slope of the chamfer, because of the sintering step.

Therefore a sharp edge could appear between the chamfer and the contact surface.

With the second chamfer 14 of the invention, the appearance of such a sharp edge is prevented. The green and sintered fuel pellets 1 of the invention therefore present a better in-service behavior and a substantial reduction in surface defects, which greatly raises the production yield. Furthermore, the risks of cladding failure are reduced.

As mentioned above, the fuel pellet 1 of the invention is adapted to be used in a PWR, including VVER, as well as in a BWR or in a PHWR. The general shape of the fuel pellet 1 is the same for use in these various types of reactors and only the dimensions of the fuel pellet 1 need to be adapted.

Other variants of the shape of the above-described fuel pellet 1 are possible. For example, the dish-shaped recess 16 can be replaced by a flat surface or a bore can be provided around the central axis A to give the fuel pellet 1 a ring shape. The shape of the recess 16 can also be modified. For example, the recess 16 can be a truncated cone.

According to another variant, the end faces 6 each have a different shape or exhibit different slope dimensions, recess dimensions, etc. Thus, the end faces 6 are not necessarily symmetrical relative to the plane P.

What is claimed is:

1. A sintered fuel pellet for a water nuclear reactor fuel rod, the sintered fuel pellet comprising: a peripheral wall extending along a central axis; and two end faces, wherein at least one of the two end faces comprises at least a first chamfer extending from the peripheral wall towards the central axis having a first non-zero slope with respect to a first plane perpendicular to the central axis and a second chamfer extending from the first chamfer towards the central axis having a second non-zero slope with respect to the first plane perpendicular to the central axis, wherein the first slope is different from the second slope, the at least one end face further includes a further surface, the second chamfer extending from an edge of the first chamfer to an edge of the further surface, the second chamfer protruding axially further than the first chamfer and the further surface to form a contact surface of the sintered pellet for contacting a neighboring pellet when sintered pellet and the neighboring pellet are superposed in a cladding to form a fuel rod, the further surface defining a dish-shaped recess extending from the second chamfer and around the central axis.

2. The sintered fuel pellet according to claim 1 wherein the first slope is greater than the second slope.

3. The sintered fuel pellet according to claim 1 wherein the first slope is between 7° and 40°.

4. The sintered fuel pellet according to claim 1 wherein the second slope is between 0.2° and 10°.

5. The sintered fuel pellet according to claim 4 wherein the second slope is between 0.4° and 9°.

6. The sintered fuel pellet according to claim 1 wherein the peripheral wall is substantially cylindrical.

7. The sintered fuel pellet according to claim 1 wherein the two end faces are substantially symmetrical relative to a second plane, the second plane being substantially perpendicular to the central axis and crossing the peripheral wall substantially in the middle of the peripheral wall.

8. The sintered fuel pellet according to claim 1 wherein the peripheral wall has a ratio between a length of the peripheral wall and a diameter of the peripheral wall, the ratio being between 0.4 and 2.

9. The sintered fuel pellet according to claim 1 wherein each of the two end faces comprises at least the first chamfer extending from the peripheral wall towards the central axis having the first non-zero slope with respect to the first plane perpendicular to the central axis and the second chamfer extending from the first chamfer towards the central axis with the second non-zero slope with respect to the first plane perpendicular to the central axis, wherein the first slope is different from the second slope.

10. A green fuel pellet for a water nuclear reactor fuel rod, the green fuel pellet intended to be sintered to obtain a sintered fuel pellet according to claim 1, the green fuel pellet comprising: a peripheral wall extending along a central axis and two end faces, wherein at least one of the end faces comprises at least a first chamfer extending from the peripheral wall towards the central axis with a first non-zero slope with respect to a plane perpendicular to the central axis and a second chamfer extending from the first chamfer towards the central axis with a second non-zero slope with respect to the plane perpendicular to the central axis, wherein the first slope is different from the second slope, the at least one end face further includes a further surface, the second chamfer extending from an edge of the first chamfer to an edge of the further surface, the second chamfer protruding axially further than the first chamfer and the further surface to form a contact surface of the sintered pellet for contacting a neighboring pellet when sintered pellet and the neighboring pellet are superposed in a cladding to form a fuel rod, the further surface defining a dish-shaped recess extending from the second chamfer and around the central axis.

11. The green fuel pellet according to claim 10 wherein the first slope is between 7° and 40°.

12. The green fuel pellet according to claim 10 wherein the second slope is between 0.2° and 10°.

13. The green fuel pellet according to claim 12 wherein the second slope is between 0.4° and 9°.

14. A fuel rod for a nuclear fuel assembly comprising: a cladding; and a stack of sintered fuel pellets in the cladding, wherein at least one of the sintered fuel pellets is a pellet according to claim 1.

15. A nuclear fuel assembly comprising: a skeleton; and a bundle of fuel rods, wherein at least one of the fuel rods is a fuel rod according to claim 14.

* * * * *